_United States Patent Office_

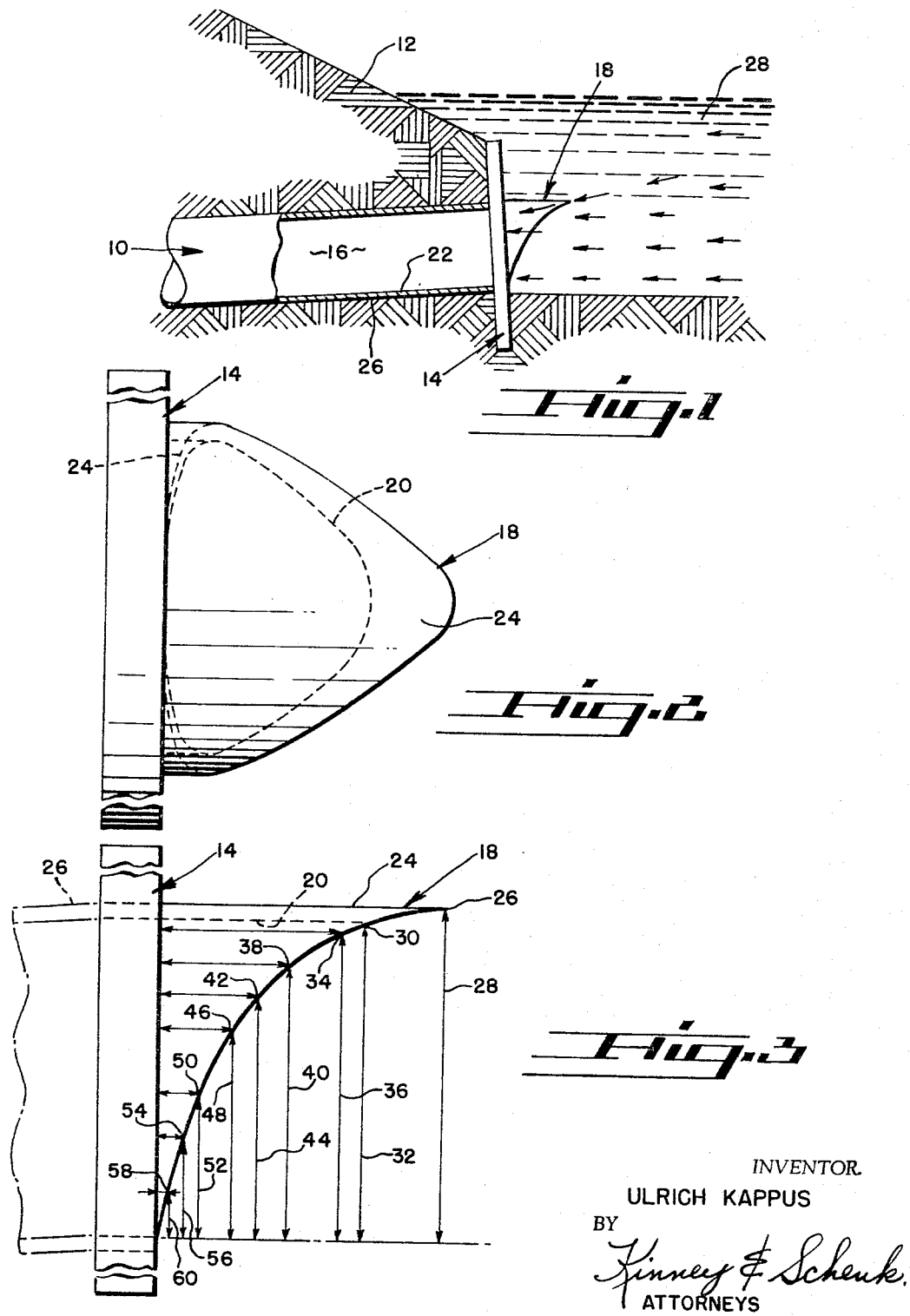

3,334,660
Patented Aug. 8, 1967

3,334,660
HOOD FOR CONDUIT
Ulrich Kappus, 9910 Zig Zag Road,
Cincinnati, Ohio 45242
Filed July 19, 1965, Ser. No. 472,986
16 Claims. (Cl. 138—39)

This invention relates to conduits and, more particularly, to a hood for use with a liquid conduit such as a culvert, for example.

One of the most critical problems in the flow of liquid through a conduit such as a culvert, for example, is to utilize the entire area of the passage extending through the conduit. When the height of the water becomes equal to or greater than the height of the conduit at its entrance, it would seem that the passage in the conduit would be completely filled. However, because of several factors, this does not occur and a portion (approximately one-third) of the passage of the conduit does not carry water.

One of the factors causing this problem is orifice flow. An example of orifice flow is if a hole having a diameter of six inches were cut into the side of a storage tank, it would seem that the discharging jet would have a diameter of six inches. However, due to contractions as the water enters the hole, the effective diameter of the discharging jet through the hole may be only about four inches in diameter.

This phenomenon of orifice flow also occurs at entrances to conduits; if the contractions could be avoided, then orifice flow can be avoided. Since the entrance to the conduit may be considered an orifice in the side of a storage tank, which is the reservoir of water being drained through the conduit, the contractions resulting from orifice flow occur at the entrance to the conduit to reduce the amount of water entering the conduit in comparison with the size of the opening of the entrance.

Another problem, which prevents full utilization of the passage of a conduit, is the formation of a vortex. A vortex forms at the entrance of a conduit because the velocity of the liquid accelerates as it approaches the entrance. Since the increase in velocity of moving liquid results in a decrease of pressure head, a suction exists at the entrance of the conduit. Since atmospheric pressure exists above the liquid and negative pressure exists within the passage of the conduit due to the reduced pressure head, air will be sucked into the passage of the conduit to reduce the available volume therein for the liquid flowing therethrough.

The present invention satisfactorily solves the foregoing problems by employing a hood, which is attached to the entrance of the conduit. The hood eliminates the orifice flow problem and functions as an anti-vortex device.

It is believed that the hood eliminates the orifice flow because the hood fills with water and, therefore, prevents any contraction of the moving liquid as it enters the conduit since there is no change in size of the passage from the hood to the conduit. It is believed that the hood functions to reduce the velocity of the liquid as it enters the conduit. Additionally, the hood causes the air above the reservoir of water to travel a greater distance to the entrance of the conduit. Thus, the vortex is substantially eliminated because of the change in the velocity of the water entering the entrance to the conduit and of the increased distance for any air to travel to reach the entrance of the conduit.

An object of this invention is to provide a device to increase liquid flow through a conduit when the height of the liquid at the entrance of the conduit is equal to or greater than the size of the entrance of the conduit.

Another object of this invention is to provide a device to allow liquid to completely fill the passage in a conduit when the height of the liquid at the entrance of the conduit is equal to or greater than the size of the conduit entrance.

Other objects, uses, and advantages of this invention are apparent upon a reading of this description, which proceeds with reference to the drawing forming part thereof and wherein:

FIGURE 1 is an elevation view, partly in section, of a conduit having the hood of the present invention attached thereto.

FIGURE 2 is a top plan view of the hood of the present invention and a headwall of a conduit.

FIGURE 3 is a side elevational view of the hood of the present invention with a portion of the conduit shown in phantom along with its headwall.

Referring to the drawing and particularly FIGURE 1, there is shown a cylindrical conduit 10 such as a culvert, for example, disposed beneath an earth fill 12. The conduit 10 has a headwall 14 disposed over the entrance to a passage 16 of the conduit 10.

A hood 18 is attached to the headwall or culvert 14 through suitable means (not shown). The hood 18 has an inner wall 20, which has the same circumference at the end of the hood 18 disposed at the entrance of the conduit 10 as an inner wall 22 of the cylindrical conduit 10. The hood 18 has an outer wall 24 of the same circumference at its end adjacent the entrance of the conduit 10 as an outer wall 26 of the conduit 10.

In order for the hood 18 to permit the passage 16, which is defined by the inner wall 22, to be completely filled with liquid when the height of a liquid reservoir 28, which is disposed behind the fill 12, is greater than the diameter of the passage 16, the hood 18 must be designed with specific contour limitations. Both the inner wall 20 and the outer wall 24 of the hood 18, as previously mentioned, have the same circumference adjacent the entrance of the conduit 10 as the inner wall 22 and the outer wall 26, respectively, of the conduit 10. However, the distance that each of the various portions of the inner wall 20 and the outer wall 24 of the hood 18 extends from the entrance of the conduit 10 varies in accordance with the distances of the inner wall 20 and the outer wall 24, respectively from the bottom of the inner wall 20.

Accordingly, as shown in FIGURE 3, the maximum distance of the outer wall 24 from the end of the hood 18 adjacent the entrance of the conduit 10 extends to a point 26, which is located $1.00D+T$ (D is the diameter of the inner wall 20 of the hood 18 and T is the wall thickness of the inner wall 20 of the hood 18) from the bottom of the inner wall 20 of the hood 18. The distance $(1.00D+T)$ of the point 26 from the bottom of the inner wall 20 is indicated by 28. The maximum distance of the outer wall 24 of the hood 18 from the end of the hood 18 adjacent to the entrance of the conduit 10 is preferably $.738D+3T$. However, this maximum distance can vary from $.14D+3T$ to $1.20D+3T$.

The maximum distance of the inner wall 20 of the hood 18 from the end of the hood 18 adjacent the entance of the conduit 10 is located at a point 30, which is 1.00D from the bottom of the inner wall 20. The distance of the point 30 from the bottom of the inner wall 20 is indicated by 32. The point 30 preferably is .738D from the end of the hood 18 adjacent to the entrance of the conduit 10. However, the distance of the point 30 varies from a minimum of .14D to a maximum of 1.20D. It also should be understood that the point 30 represents a position of a portion of the outer wall 24 of the hood 18 when it is located at 1.00D, as indicated by 32, from the bottom of the inner wall 20 of the hood 18.

A point 34 is located a distance of .975D, as indicated by 36, from the bottom of the inner wall 20 of the hood 18. The point 34 is preferably a distance of .549D from the end of the hood 18 adjacent the entrance of the conduit 10. However, it may vary from .13D to 1.06D.

A point 38 is located a distance of .871D, as indicated by 40, from the bottom of the inner wall 20 of the hood 18. The point 38 is preferably located at .408D from the end of the hood 18 adjacent the entrance of the conduit 10 and defines a distance of both the inner wall 20 and the outer wall 24 of the hood 18 from the end of the hood 18 adjacent the entrance of the conduit 10 when each is disposed .871D from the bottom of the inner wall 20. The distance of the point 38 from the end of the hood 18 adjacent to the entrance of the conduit 10 may vary from .090D to .900D.

A point 42 is disposed at .780D, as indicated by 44, from the bottom of the inner wall 20 of the hood 18. The point 42, which defines a position on both the inner wall 20 and the outer wall 24 of the hood 18, is preferably .314D from the end of the hood 18 adjacent the entrance of the conduit. However, it may vary from .059 to .775D.

A point 46 is located at a distance of .685D, as indicated by 48, from the bottom of the inner wall 20 of the hood 18. The point 46 is preferably a distance of .222D from the end of the hood 18 adjacent the entrance of the conduit 10. However, it may vary from .055D to .619D.

A point 50 is located at a distance of .510D, as indicated by 52, from the bottom of the inner wall 20 of the hood 18. The point 50 is preferably a distance of .130D from the end of the hood 18 adjacent the entrance of the conduit 10. However, it may vary from .030D to .386D.

A point 54 is located at a distance of .324D, as indicated by 56, from the bottom of the inner wall 20 of the hood 18. The point 54 is preferably a distance of .074D from the end of the hood 18 adjacent the entrance of the conduit 10. However, it may vary from .019D to .185D.

A point 58 is located at a distance of .139D, as indicated by 60, from the bottom of the inner wall 20 of the hood 18. The point 58 is preferably a distance of .039D from the end of the hood 18 adjacent the entrance of the conduit 10. However, it may vary from .011D to .055D.

It should be understood that the opposite side of the hood 18 is similarly formed since the hood 18 is symmetrical. Furthermore, it should be understood that the minimum distance of the points 26, 30, 34, 38, 42, 46, 50, 54, and 58 from the end of the hood 18 adjacent the entrance of the conduit 10 must all be used at the same time to produce the desired result; similarly, all of the maximum distances must be used at the same time. This is in order to produce the smooth curve, which is shown in side elevation in FIGURE 3. Any distance, other than the preferred distance, between the minimum and maximum would be selected in a ratio to give the desired smooth curve to the side elevation of the hood 18.

By constructing the hood 18 in the specific manner described herein within the relationships of sizes in comparison with the diameter of the inner wall 20, which has the same circumference adjacent the entrance of the conduit 10 as the inner wall 22 of the conduit 10, the passage 16 will be filled to capacity whenever the height of the liquid reservoir 28 is equal to or greater than the diameter of the inner wall 22 of the conduit 10.

This construction of the hood 18 eliminates the orifice flow because of the specific extension of its top away from the entrance of the conduit 10. The smooth curve of the hood 18 from its top to its bottom prevents any great turbulence in the flow of the liquid into the passage 16 of the conduit 10. Likewise, by extending the top of the hood 18 further than the bottom, the vortex is substantially reduced. Thus, the entire area of the passage 16 is filled.

It should be understood that the hood 18 may be formed of steel or concrete or any other suitable material. Furthermore, it should be understood that the hood may be employed with conduits having different types of shaped passages than circular such as elliptical, square, or the like, for example. With such different shape passages, the inner wall of the hood would have the same periphery adjacent the entrance of the conduit as the passage in the conduit and the outer wall of the hood would have the same periphery adjacent the entrance of the conduit as the outer wall of the conduit. The points, which form the side elevation contour of the hood, would still be calculated in comparison with the distance from the bottom of the inner wall of the hood.

An advantage of this invention is that it reduces the required size of a conduit to carry a given quantity of liquid. Another advantage of this invention is that it decreases the cost of the pipe to carry a given amount of liquid. A further advantage of this invention is that the entire conduit is filled with liquid when the liquid height is equal to or greater than the height of the conduit entrance.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A hood adapted to have one end connected to a liquid conduit at its entrance, said hood comprising an outer wall having its periphery at said one end substantially equal to the periphery of the outer wall of the conduit and an inner wall having its periphery at said one end substantially equal to the periphery of the inner wall of the conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the distance from the bottom of said inner wall of said hood to the top of said inner wall of said hood, the distance of each of said inner wall and said outer wall of said hood from said one end of said hood varying from .011 to .055 of the distance from the bottom of said inner wall of said hood to the top of said inner wall of said hood when said inner wall and said outer wall of said hood are located from the bottom of said inner wall of said hood .139 of the distance from the bottom of said inner wall of said hood to the top of said inner wall of said hood, the maximum distance of the top of said inner wall of said hood from said one end of said hood varying from .14 to 1.20 of the distance from the bottom of said inner wall of said hood to the top of said inner wall of said hood whereby a smooth curve is produced in side elevation from the bottom of said inner wall of said hood to the top of said inner wall of said hood, and the maximum distance of the top of said outer wall of said hood from said one end of said hood varying from .14$D$+3$T$ to 1.20$D$+3$T$ of the distance from the bottom of said inner wall of said hood to the top of said inner wall of said hood whereby a smooth curve is produced in side elevation from the bottom of said outer wall of said hood to the top of said outer wall of said hood.

2. A hood adapted to have one end connected to a liquid conduit at its entrance, said hood comprising an outer wall having its periphery at said one end substantially equal to the periphery of the outer wall of the conduit and an inner wall having its periphery at said one end substantially equal to the periphery of the inner wall of the conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the distance from the bottom of said inner wall of said hood to the top of said inner wall of said hood, the distance of each of said inner wall and said outer wall of said hood from said one end of said hood being .039 of the distance from the bottom of said inner wall of said hood to the top of said inner wall of said hood when said inner wall and said outer wall of said hood are located from the bottom of said inner wall of said hood .139 of the distance from the bottom of said inner wall of said hood to the top of said inner wall of said hood, the maximum distance of the top of said inner wall of said hood from said one end of said hood being .738 of the distance from the bottom of said inner wall of said hood to the top of said inner wall of said hood whereby a smooth curve is produced in side elevation from the bottom of said inner wall of said hood to the top of said inner wall of said hood, and the maximum distance of the top of said outer wall of said hood from said one end of said hood being .738+3$T$ of the distance from the bottom of said inner wall of said hood to the top of said inner wall of said hood whereby a smooth curve is produced in side elevation from the bottom of said outer wall of said hood to the top of said outer wall of said hood.

3. A hood adapted to have one end connected to a liquid conduit at its entrance, said hood comprising an outer wall having its periphery at said one end substantially equal to the periphery of the outer wall of the conduit and an inner wall having its periphery at said one end substantially equal to the periphery of the inner wall of the conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the distance from the bottom of said inner wall of said hood to the top of said inner wall of said hood, the distance of each of said inner wall and said outer wall of said hood from said one end of said hood being .039 of the distance from the bottom of said inner wall of said hood to the top of said inner wall of said hood when said inner wall and said outer wall of said hood are located from the bottom of said inner wall of said hood .139 of the distance from the bottom of said inner wall of said hood to the top of said inner wall of said hood, the distance of each of said inner wall and said outer wall of said hood from said one end of said hood being .074 of the distance from the bottom of said inner wall of said hood to the top of said inner wall of said hood when said inner wall and said outer wall of said hood are located from the bottom of said inner wall of said hood .324 of the distance from the bottom of said inner wall of said hood to the top of said inner wall of said hood, the distance of each of said inner wall and said outer wall of said hood from said one end of said hood being .130 of the distance from the bottom of said inner wall of said hood to the top of said inner wall of said hood when said inner wall and said outer wall of said hood are located from the bottom of said inner wall of said hood .510 of the distance from the bottom of said inner wall of said hood to the top of said inner wall of said hood, the distance of each of said inner wall and said outer wall of said hood from said one end of said hood being .222 of the distance from the bottom of said inner wall of said hood to the top of said inner wall of said hood when said inner wall and said outer wall of said hood are located from the bottom of said inner wall of said hood .685 of the distance from the bottom of said inner wall of said hood to the top of said inner wall of said hood, the distance of each of said inner wall and said outer wall of said hood from said one end of said hood being .314 of the distance from the bottom of said inner wall of said hood to the top of said inner wall of said hood when said inner wall and said outer wall of said hood are located from the bottom of said inner wall of said hood .780 of the distance from the bottom of said inner wall of said hood to the top of said inner wall of said hood, the distance of each of said inner wall and said outer wall of said hood from said one end of said hood being .408 of the distance from the bottom of said inner wall of said hood to the top of said inner wall of said hood when said inner wall and said outer wall of said hood are located from the bottom of said inner wall of said hood .871 of the distance from the bottom of said inner wall of said hood to the top of said inner wall of said hood, the distance of each of said inner wall and said outer wall of said hood from said one end of said hood being .594 of the distance from the bottom of said inner wall of said hood to the top of said inner wall of said hood when said inner wall and said outer wall of said hood are located from the bottom of said inner wall of said hood .975 of the distance from the bottom of said inner wall of said hood to the top of said inner wall of said hood, the maximum distance of the top of said inner wall of said hood from said one end of said hood being .738 of the distance from the bottom of said inner wall of said hood to the top of said inner wall of said hood whereby a smooth curve is produced in side elevation from the bottom of said inner wall of said hood to the top of said inner wall of said hood, and the maximum distance of the top of said outer wall of said hood from said one end of said hood being 0.738+3$T$ of the distance from the bottom of said inner wall of said hood to the top of said inner wall of said hood whereby a smooth curve is produced in side elevation from the bottom of said outer wall of said hood to the top of said outer wall of said hood.

4. A hood adapted to have one end connected to a liquid conduit at its entrance, said hood comprising an outer wall having its periphery at said one end substantially equal to the periphery of the outer wall of the conduit and an inner wall having its periphery at said one end substantially equal to the periphery of the inner wall of the conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the distance from the bottom of said inner wall of said hood to the top of said inner wall of said hood, the distance of each of said inner wall and said outer wall of said hood from said one end of said hood being .011 of the distance from the bottom of said inner wall of said hood to the top of said inner wall of said hood when said inner wall and said outer wall of said hood are located from the bottom of said inner wall of said hood .139 of the distance from the bottom of said inner wall of said hood to the top of said inner wall of said hood, the maximum distance of the top of said inner wall of said hood from said one end of said hood being 0.14 of the distance from the bottom of said inner wall of said hood to the top of said inner wall of said hood whereby a smooth curve is produced in side elevation from the bottom of said inner wall of said hood to the top of said inner wall of said hood, and the maxmum distance of the top of said outer wall of said hood from said one end of said hood being 0.14+3$T$ of the distance from the bottom of said inner wall of said hood to the top of said inner wall of said hood whereby a smooth curve is produced in side elevation from the bottom of said outer wall of said hood to the top of said outer wall of said hood.

5. A hood adapted to have one end connected to a liquid conduit at its entrance, said hood comprising an outer wall having its periphery at said one end substantially equal to the periphery of the outer wall of the conduit and an inner wall having its periphery at said one end substantially equal to the periphery of the inner wall of the conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the distance from the bottom of said inner wall of said hood to the top of said inner wall of said hood, the distance of each of said inner wall and said outer wall of said hood from said one end of said hood being .055 of the distance from the bottom of said inner wall of said hood to the top of said inner wall of said hood when said inner wall and said outer wall of said hood are located from the bottom of said inner wall of said hood .139 of the distance from the bottom of said inner wall of said hood to the top of said inner wall of said hood, the maximum distance of the top of said inner wall of said hood from said one end of said hood being 1.20 of the distance from the bottom of said inner wall of said hood to the top of said inner wall of said hood whereby a smooth curve is produced in side elevation from the bottom of said inner wall of said hood to the top of said inner wall of said hood, and the maximum distance of the top of said outer wall of said hood from said one end of said hood being 1.20+3T of the distance from the bottom of said inner wall of said hood to the top of said inner wall of said hood whereby a smooth curve is produced in side elevation from the bottom of said outer wall of said hood to the top of said outer wall of said hood.

6. A hood adapted to have one end connected to a liquid conduit at its entrance, said hood comprising an outer wall having its periphery at said one end substantially equal to the periphery of the outer wall of the conduit and an inner wall having its periphery at said one end substantially equal to the periphery of the inner wall of the conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the distance from the bottom of said inner wall of said hood to the top of said inner wall of said hood, the distance of each of said inner wall and said outer wall of said hood from said one end of said hood being .011 of the distance from the bottom of said inner wall of said hood to the top of said inner wall of said hood when said inner wall and said outer wall of said hood are located from the bottom of said inner wall of said hood .139 of the distance from the bottom of said inner wall of said hood to the top of said inner wall of said hood, the distance of each of said inner wall and said outer wall of said hood from said one end of said hood being .019 of the distance from the bottom of said inner wall of said hood to the top of said inner wall of said hood when said inner wall and said outer wall of said hood are located from the bottom of said inner wall of said hood .324 of the distance from the bottom of said inner wall of said hood to the top of said inner wall of said hood, the distance of each of said inner wall and said outer wall of said hood from said one end of said hood being .030 of the distance from the bottom of said inner wall of said hood to the top of said inner wall of said hood when said inner wall and said outer wall of said hood are located from the bottom of said inner wall of said hood .510 of the distance from the bottom of said inner wall of said hood to the top of said inner wall of said hood, the distance of each of said inner wall and said outer wall of said hood from said one end of said hood being .055 of the distance from the bottom of said inner wall of said hood to the top of said inner wall of said hood when said inner wall and said outer wall of said hood are located from the bottom of said inner wall of said hood .685 of the distance from the bottom of said inner wall of said hood to the top of said inner wall of said hood, the distance of each of said inner wall and said outer wall of said hood from said one end of said hood being .059 of the distance from the bottom of said inner wall of said hood to the top of said inner wall of said hood when said inner wall and said outer wall of said hood are located from the bottom of said inner wall of said hood .780 of the distance from the bottom of said inner wall of said hood to the top of said inner wall of said hood, the distance of each of said inner wall and said outer wall of said hood from said one end of said hood being .090 of the distance from the bottom of said inner wall of said hood to the top of said inner wall of said hood when said inner wall and said outer wall of said hood are located from the bottom of said inner wall of said hood .871 of the distance from the bottom of said inner wall of said hood to the top of said inner wall of said hood, the distance of each of said inner wall and said outer wall of said hood from said one end of said hood being .130 of the distance from the bottom of said inner wall of said hood to the top of said inner wall of said hood when said inner wall and said outer wall of said hood are located from the bottom of said inner wall of said hood .975 of the distance from the bottom of said inner wall of said hood to the top of said inner wall of said hood, the maximum distance of the top of said inner wall of said hood from said one end of said hood being .14 of the distance from the bottom of said inner wall of said hood to the top of said inner wall of said hood whereby a smooth curve is produced in side elevation from the bottom of said inner wall of said hood to the top of said inner wall of said hood, and the maximum distance of the top of said outer wall of said hood from said one end of said hood being .14+3T of the distance from the bottom of said inner wall of said hood to the top of said inner wall of said hood whereby a smooth curve is produced in side elevation from the bottom of said outer wall of said hood to the top of said outer wall of said hood.

7. A hood adapted to have one end connected to a liquid conduit at its entrance, said hood comprising an outer wall having its periphery at said one end substantially equal to the periphery of the outer wall of the conduit and an inner wall having its periphery at said one end substantially equal to the periphery of the inner wall of the conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the distance from the bottom of said inner wall of said hood to the top of said inner wall of said hood, the distance of each of said inner wall and said outer wall of said hood from said one end of said hood being .055 of the distance from the bottom of said inner wall of said hood to the top of said inner wall of said hood when said inner wall and said outer wall of said hood are located from the bottom of said inner wall of said hood .139 of the distance from the bottom of said inner wall of said hood to the top of said inner wall of said hood, the distance of each of said inner wall and said outer wall of said hood from said one end of said hood being .185 of the distance from the bottom of said inner wall of said hood to the top of said inner wall of said hood when said inner wall and said outer wall of said hood are located from the bottom of said inner wall of said hood .324 of the distance from the bottom of said inner wall of said hood to the top of said inner wall of said hood, the distance of each of said inner wall and said outer wall of said hood from said one end of said hood being .386 of the distance from the bottom of said inner wall of said hood to the top of said inner wall of said hood when said inner wall and said outer wall of said hood are located from the bottom of said inner wall of said hood .510 of the distance from the bottom of said inner wall of said hood to the top of said inner wall of said hood, the distance of each of said inner wall and said outer wall of said hood from said one end of said hood being .619 of the distance from the bottom of said inner wall of said hood to the top of said inner wall of said hood when said inner wall and said outer wall of said hood are located from the bottom of said inner wall of said hood .685 of the distance from the bottom of said inner wall of said hood to the top of said inner wall of said hood, the distance of each of said inner wall and said outer wall of said hood from said one end of said hood being .775 of the distance from the bottom of said inner wall of said hood to the top of said inner wall of said hood when said inner wall and said outer wall and said hood are located from the bottom of said inner wall of said hood to the top of said inner wall of said hood, the distance of each of said inner wall and said outer wall of said hood from said one end of said hood being .900 of the distance from the bottom of said inner wall of said hood to the top of said inner wall of said hood when said inner wall and said outer wall of said hood are located from the bottom of said inner wall of said hood .871 of the distance from the bottom of said inner wall of said hood to the top of said inner wall of said hood, the distance of each of said inner wall and said outer wall of said hood from said one end of said hood being 1.06 of the distance from the bottom of said inner wall of said hood to the top of said inner wall of said hood when said inner wall and said outer wall of said hood are located from the bottom of said inner wall of said hood .975 of the distance from the bottom of said inner wall of said hood to the top of said inner wall of said hood, the maximum distance of the top of said inner wall of said hood from said one end of said hood being 1.20 of the distance from the bottom of said inner wall of said hood to the top of said inner wall of said hood whereby a smooth curve is produced in side elevation from the bottom of said inner wall of said hood to the top of said inner wall of said hood, and the maximum distance of the top of said outer wall of said hood from said one end of said hood being 1.20+3$T$ of the distance from the bottom of said inner wall of said hood to the top of said inner wall of said hood whereby a smooth curve is produced in side elevation from the bottom of said outer wall of said hood to the top of said outer wall of said hood.

8. A hood adapted to have one end connected to a liquid conduit at its entrance, said hood comprising an outer wall having its periphery at said one end substantially equal to the periphery of the outer wall of the conduit and an inner wall having its periphery at said one end substantially equal to the periphery of the inner wall of the conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the distance from the bottom of said inner wall of said hood to the top of said inner wall of said hood, the distance of each of said inner wall and said outer wall of said hood from said one end of said hood varying from .011 to .055 of the distance from the bottom of said inner wall of said hood to the top of said inner wall of said hood when said inner wall and said outer wall of said hood are located from the bottom of said inner wall of said hood .139 of the distance from the bottom of said inner wall of said hood to the top of said inner wall of said hood, the distance of each of said inner wall and said outer wall of said hood from said one end of said hood varying from .019 to .185 of the distance from the bottom of said inner wall of said hood to the top of said inner wall of said hood when said inner wall and said outer wall of said hood to the top of said inner wall of said hood, the distance of each of said inner wall and said outer wall of said hood from said one end of said hood varying from .030 to .386 of the distance from the bottom of said inner wall of said hood to the top of said inner wall of said hood when said inner wall and said outer wall of said hood are located from the bottom of said inner wall of said hood .510 of the distance from the bottom of said inner wall of said hood to the top of said inner wall of said hood, the distance of each of said inner wall and said outer wall of said hood from said one end of said hood varying from .055 to .619 of the distance from the bottom of said inner wall of said hood to the top of said inner wall of said hood when said inner wall and said outer wall of said hood are located from the bottom of said inner wall of said hood .685 of the distance from the bottom of said inner wall of said hood to the top of said inner wall of said hood, the distance of each of said inner wall and said outer wall of said hood from said one end of said hood varying from .059 to .775 of the distance from the bottom of said inner wall of said hood to the top of said inner wall of said hood when said inner wall and said outer wall of said hood are located from the bottom of said inner wall of said hood .780 of the distance from the bottom of said inner wall of said hood to the top of said inner wall of said hood, the distance of each of said inner wall and said outer wall of said hood from said one end of said hood varying from .090 to .900 of the distance from the bottom of said inner wall of said hood to the top of said inner wall of said hood when said inner wall and said outer wall of said hood are located from the bottom of said inner wall of said hood .871 of the distance from the bottom of said inner wall of said hood to the top of said inner wall of said hood, the distance of each of said inner wall and said outer wall of said hood from said one end of said hood varying from .130 to 1.06 of the distance from the bottom of said inner wall of said hood to the top of said inner wall of said hood when said inner wall and said outer wall of said hood are located from the bottom of said inner wall of said hood .975 of the distance from the bottom of said inner wall of said hood to the top of said inner wall of said hood, the maximum distance of the top of said inner wall of said hood from said one end of said hood varying from .14 to 1.20 of the distance from the bottom of said inner wall of said hood to the top of said inner wall of said hood whereby a smooth curve is produced in side elevation from the bottom of said inner wall of said hood to the top of said inner wall of said hood, and the maximum distance of the top of said outer wall of said hood from said one end of said hood varying from .14+3$T$ to 1.20+3$T$ of the distance from the bottom of said inner wall of said hood to the top of said inner wall of said hood whereby a smooth curve is produced in side elevation from the bottom of said outer wall of said hood to the top of said outer wall of said hood.

9. A hood adapted to have one end connected to a cylindrical liquid conduit at its entrance, said hood comprising an outer wall having its circumference at said one end substantially equal to the circumference of the outer wall of the cylindrical conduit and an inner wall having its circumference at said one end substantially equal to the circumference of the inner wall of the cylindrical conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the diameter of said inner wall of said hood, the distance of each of said inner wall and said outer wall of said hood from said one end of said hood varying from .011 to .055 of the diameter of said inner wall of said hood when said inner wall and said outer wall of said hood are located from the bottom of said inner wall of said hood .139 of the diameter of said inner wall of said hood, the maximum distance of the top of said inner wall of said hood from said one end of said hood varying from .14 to 1.20 of the diameter of said inner wall of said hood whereby a smooth curve is produced in side elevation from the bottom of said inner wall of said hood to the top of said inner wall of said hood, and the maximum distance of the top of said outer wall of said hood from said one end of said hood varying from $.14+3T$ to $1.20+3T$ of the diameter of said inner wall of said hood whereby a smooth curve is produced in side elevation from the bottom of said outer wall of said hood to the top of said outer wall of said hood.

10. A hood adapted to have one end connected to a cylindrical liquid conduit at its entrance, said hood comprising an outer wall having its circumference at said one end substantially equal to the circumference of the outer wall of the cylindrical conduit and an inner wall having its circumference at said one end substantially equal to the circumference of the inner wall of the cylindrical conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the diameter of said inner wall of said hood, the distance of each of said inner wall and said outer wall of said hood from said one end of said hood being .039 of the diameter of said inner wall of said hood when said inner wall and said outer wall of said hood are located from the bottom of said inner wall of said hood .139 of the diameter of said inner wall of said hood, the maximum distance of the top of said inner wall of said hood from said one end of said hood being .738 of the diameter of said inner wall of said hood whereby a smooth curve is produced in side elevation from the bottom of said inner wall of said hood to the top of said inner wall of said hood, and the maximum distance of the top of said outer wall of said hood from said one end of said hood being $.738+3T$ of the diameter of said inner wall of said hood whereby a smooth curve is produced in side elevation from the bottom of said outer wall of said hood to the top of said outer wall of said hood.

11. A hood adapted to have one end connected to a cylindrical liquid conduit at its entrance, said hood comprising an outer wall having its circumference at said one end substantially equal to the circumference of the outer wall of the cylindrical conduit and an inner wall having its circumference at said one end substantially equal to the circumference of the inner wall of the cylindrical conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the diameter of said inner wall of said hood, the distance of each of said inner wall and said outer wall of said hood from said one end of said hood being .039 of the diameter of said inner wall of said hood when said inner wall and said outer wall of said hood are located from the bottom of said inner wall of said hood .139 of the diameter of said inner wall of said hood, the distance of each of said inner wall and said outer wall of said hood from said one end of said hood being .074 of the diameter of said inner wall of said hood when said inner wall and said outer wall of said hood are located from the bottom of said inner wall of said hood .324 of the diameter of said inner wall of said hood, the distance of each of said inner wall and said outer wall of said hood from said one end of said hood being .130 of the diameter of said inner wall of said hood when said inner wall and said outer wall of said hood are located from the bottom of said inner wall of said hood .510 of the diameter of said inner wall of said hood, the distance of each of said inner wall and said outer wall of said hood from said one end of said hood being .222 of the diameter of said inner wall of said hood when said inner wall and said outer wall of said hood are located from the bottom of said inner wall of said hood .685 of the diameter of said inner wall of said hood, the distance of each of said inner wall and said outer wall of said hood from said one end of said hood being .314 of the diameter of said inner wall of said hood when said inner wall and said outer wall of said hood are located from the bottom of said inner wall of said hood .780 of the diameter of said inner wall of said hood, the distance of each of said inner wall and said outer wall of said hood from said one end of said hood being .408 of the diameter of said inner wall of said hood when said inner wall and said outer wall of said hood are located from the bottom of said inner wall of said hood .871 of the diameter of said inner wall of said hood, the distance of each of said inner wall and said outer wall of said hood from said one end of said hood being .594 of the diameter of said inner wall of said hood when said inner wall and said outer wall of said hood are located from the bottom of said inner wall of said hood .975 of the diameter of said inner wall of said hood, the maximum distance of the top of said inner wall of said hood from said one end of said hood being .738 of the diameter of said inner wall of said hood whereby a smooth curve is produced in side elevation from the bottom of said inner wall of said hood to the top of said inner wall of said hood, and the maximum distance of the top of said outer wall of said hood from said one end of said hood being $.738+3T$ of the diameter of said inner wall of said hood whereby a smooth curve is produced in side elevation from the bottom of said outer wall of said hood to the top of said outer wall of said hood.

12. A hood adapted to have one end connected to a cylindrical liquid conduit at its entrance, said hood comprising an outer wall having its circumference at said one end substantially equal to the circumference of the outer wall of the cylindrical conduit and an inner wall having its circumference at said one end substantially equal to the circumference of the inner wall of the cylindrical conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the diameter of said inner wall of said hood, the distance of each of said inner wall and said outer wall of said hood from said one end of said hood being .011 of the diameter of said inner wall of said hood when said inner wall and said outer wall of said hood are located from the bottom of said inner wall of said hood .139 of the diameter of said inner wall of said hood, the maximum distance of the top of said inner wall of said hood from said one end of said hood being .14 of the diameter of said inner wall of said hood whereby a smooth curve is produced in side elevation from the bottom of said inner wall of said hood to the top of said inner wall of said hood, and the maximum distance of the top of said outer wall of said hood from said one end of said hood being $.14+3T$ of the diameter of said inner wall of said hood whereby a smooth curve is produced in side elevation from the bottom of said outer wall of said hood to the top of said outer wall of said hood.

13. A hood adapted to have one end connected to a cylindrical liquid conduit at its entrance, said hood comprising an outer wall having its circumference at said one end substantially equal to the circumference of the outer wall of the cylindrical conduit and an inner wall having its circumference at said one end substantially equal to the circumference of the inner wall of the cylindrical conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the diameter of said inner wall of said hood, the distance of each of said inner wall and said outer wall of said hood from said one end of said hood being .055 of the diameter of said inner wall of said hood when said inner wall and said outer wall of said hood are located from the bottom of said inner wall of said hood .139 of the diameter of said inner wall of said hood, the maximum distance of the top of said inner wall of said hood from said one end of said hood being 1.20 of the diameter of said inner wall of said hood whereby a smooth curve is produced in side elevation from the bottom of said inner wall of said hood to the top of said inner wall of said hood, and the maximum distance of the top of said outer wall of said hood from said one end of said hood being $1.20+3T$ of the diameter of said inner wall of said hood whereby a smooth curve is produced in side elevation from the bottom of said outer wall of said hood to the top of said outer wall of said hood.

14. A hood adapted to have one end connected to a cylindrical liquid conduit at its entrance, said hood comprising an outer wall having its circumference at said one end substantially equal to the circumference of the outer wall of the cylindrical conduit and an inner wall having its circumference at said one end substantially equal to the circumference of the inner wall of the cylindrical conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the diameter of said inner wall of said hood, the distance of each of said inner wall and said outer wall of said hood from said one end of said hood being .011 of the diameter of said inner wall of said hood when said inner wall and said outer wall of said hood are located from the bottom of said inner wall of said hood .139 of the diameter of said inner wall of said hood, the distance of said inner wall and said outer wall of said hood from said one end of said hood being .019 of the diameter of said inner wall of said hood when said inner wall and said outer wall of said hood are located from the bottom of said inner wall of said hood .324 of the diameter of said inner wall of said hood, the distance of each of said inner wall and said outer wall of said hood from said one end of said hood being .030 of the diameter of said inner wall of said hood when said inner wall and said outer wall of said hood are located from the bottom of said inner wall of said hood .510 of the diameter of said inner wall of said hood, the distance of each of said inner wall and said outer wall of said hood from said one end of said hood being .055 of the diameter of said inner wall of said hood when said inner wall and said outer wall of said hood are located from the bottom of said inner wall of said hood .685 of the diameter of said inner wall of said hood, the distance of each of said inner wall and said outer wall of said hood from said one end of said hood being .059 of the diameter of said inner wall of said hood when said inner wall and said outer wall of said hood are located from the bottom of said inner wall of said hood .780 of the diameter of said inner wall of said hood, the distance of each of said inner wall and said outer wall of said hood from said one end of said hood being .090 of the diameter of said inner wall of said hood when said inner wall and said outer wall of said hood are located from the bottom of said inner wall of said hood .871 of the diameter of said inner wall of said hood, the distance of each of said inner wall and said outer wall of said hood from said one end of said hood being .130 of the diameter of said inner wall of said hood when said inner wall and said outer wall of said hood are located from the bottom of said inner wall of said hood .975 of the diameter of said inner wall of said hood, the maximum distance of the top of said inner wall of said hood from said one end of said hood being .14 of the diameter of said inner wall of said hood whereby a smooth curve is produced in side elevation from the bottom of said inner wall of said hood to the top of said inner wall of said hood, and the maximum distance of the top of said outer wall of said hood from said one end of said hood being $.14+3T$ of the diameter of said inner wall of said hood whereby a smooth curve is produced in side elevation from the bottom of said outer wall of said hood to the top of said outer wall of said hood.

15. A hood adapted to have one end connected to a cylindrical liquid conduit at its entrance, said hood comprising an outer wall having its circumference at said one end substantially equal to the circumference of the outer wall of the cylindrical conduit and an inner wall having its circumference at said one end substantially equal to the circumference of the inner wall of the cylindrical conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the diameter of said inner wall of said hood, the distance of each of said inner wall and said outer wall of said hood from said one end of said hood being .055 of the diameter of said inner wall of said hood when said inner wall and said outer wall of said hood are located from the bottom of said inner wall of said hood .139 of the diameter of said inner wall of said hood, the distance of each of said inner wall and said outer wall of said hood from said one end of said hood being .185 of the diameter of said inner wall of said hood when said inner wall and said outer wall of said hood are located from the bottom of said inner wall of said hood .324 of the diameter of said inner wall of said hood, the distance of each of said inner wall and said outer wall of said hood from said one end of said hood being .386 of the diameter of said inner wall of said hood when said inner wall and said outer wall of said hood are located from the bottom of said inner wall of said hood .510 of the diameter of said inner wall of said hood, the distance of each of said inner wall and said outer wall of said hood from said one end of said hood being .619 of the diameter of said inner wall of said hood when said inner wall and said outer wall of said hood are located from the bottom of said inner wall of said hood .685 of the diameter of said inner wall of said hood, the distance of each of said inner wall and said outer wall of said hood from said one end of said hood being .775 of the diameter of said inner wall of said hood when said inner wall and said outer wall of said hood are located from the bottom of said inner wall of said hood .780 of the diameter of said inner wall of said hood, the distance of each of said inner wall and said outer wall of said hood from said one end of said hood being .900 of the diameter of said inner wall of said hood when said inner wall and said outer wall of said hood are located from the bottom of said inner wall of said hood .871 of the diameter of said inner wall of said hood, the distance of each of said inner wall and said outer wall of said hood from said one end of said hood being 1.06 of the diameter of said inner wall of said hood when said inner wall and said outer wall of said hood are located from the bottom of said inner wall of said hood .975 of the diameter of said inner wall of said hood, the maximum distance of the top of said inner wall of said hood from said one end of said hood being 1.20 of the diameter of said inner wall of said hood whereby a smooth curve is produced in side elevation from the bottom of said inner wall of said hood to the top of said inner wall of said hood, and the maximum distance of the top of said outer wall of said hood from said one end of said hood being $1.20+3T$ of the diameter of said inner wall of said hood whereby a smooth curve is produced in side elevation from the bottom of said outer wall of said hood to the top of said outer wall of said hood.

16. A hood adapted to have one end connected to a cylindrical liquid conduit at its entrance, said hood comprising an outer wall having its circumference at said one end substantially equal to the circumference of the outer wall of the cylindrical conduit and an inner wall having its circumference at said one end substantially equal to the circumference of the inner wall of the cylindrical conduit, said outer wall and said inner wall of said hood extending from said one end of said hood in increasing distance from the portion of said hood adapted to be connected to the bottom of the conduit to the portion of said hood adapted to be connected to the top of the conduit, the distance varying in accordance with the distance from the bottom of said inner wall of said hood to the top of said inner wall of said hood, the distance of each of said inner wall and said outer wall of said hood from said one end of said hood varying from .011 to .055 of the diameter of said inner wall of said hood when said inner wall and said outer wall of said hood are located from the bottom of said inner wall of said hood .139 of the diameter of said inner wall of said hood, the distance of each of said inner wall and said outer wall of said hood from said one end of said hood varying from .019 to .185 of the diameter of said inner wall of said hood when said inner wall and said outer wall of said hood are located from the bottom of said inner wall of said hood .324 of the diameter of said inner wall of said hood, the distance of each of said inner wall and said outer wall of said hood from said one end of said hood varying from .030 to .386 of the diameter of said inner wall of said hood when said inner wall and said outer wall of said hood are located from the bottom of said inner wall of said hood .510 of the diameter of said inner wall of said hood, the distance of each of said inner wall and said outer wall of said hood from said one end of said hood varying from .055 to .619 of the diameter of said inner wall of said hood when said inner wall and said outer wall of said hood are located from the bottom of said inner wall of said hood .685 of the diameter of said inner wall of said hood, the distance of each of said inner wall and said outer wall of said hood from said one end of said hood varying from .059 to .775 of the diameter of said inner wall of said hood when said inner wall and said outer wall of said hood are located from the bottom of said inner wall of said hood .780 of the diameter of said inner wall of said hood, the distance of each of said inner wall and said outer wall of said hood from said one end of said hood varying from .090 to .900 of the diameter of said inner wall of said hood when said inner wall and said outer wall of said hood are located from the bottom of said inner wall of said hood .871 of the diameter of said inner wall of said hood, the distance of each of said inner wall and said outer wall of said hood from said one end of said hood varying from .130 to 1.06 of the diameter of said inner wall of said hood when said inner wall and said outer wall of said hood are located from the bottom of said inner wall of said hood .975 of the diameter of said inner wall of said hood, the maximum distance of the top of said inner wall of said hood from said one end of said hood varying from .14 to 1.20 of the diameter of said inner wall of said hood whereby a smooth curve is produced in side elevation from the bottom of said inner wall of said hood to the top of said inner wall of said hood, and the maximum distance of the top of said outer wall of said hood from said one end of said hood varying from $.14+3T$ to $1.20+3T$ of the diameter of said inner wall of said hood whereby a smooth curve is produced in side elevation from the bottom of said outer wall of said hood to the top of said outer wall of said hood.

References Cited
UNITED STATES PATENTS

| | | | |
|---|---|---|---|
| 1,878,383 | 9/1932 | Crouse | 61—17 |
| 2,938,334 | 5/1960 | McLafferty | 137—15.1 |
| 2,971,331 | 2/1961 | Silverman et al. | 137—15.1 |
| 3,242,671 | 3/1966 | Moorehead | 137—15.1 |

OTHER REFERENCES

California Highways and Public Works, "California Culvert Practice," Entrances and Headwalls, chapter IV, 1944, pp. 31–40.

LAVERNE D. GEIGER, *Primary Examiner.*

B. KILE, *Assistant Examiner.*